United States Patent
Tsui et al.

(10) Patent No.: US 8,593,430 B2
(45) Date of Patent: Nov. 26, 2013

(54) METHOD, DEVICE AND TERMINAL APPARATUS FOR PROCESSING CAPACITANCE OF RESPECTIVE LAYERS OF MULTI-TOUCH PANEL

(75) Inventors: Ping Fong Tsui, Shatin (HK); Chin Sing Li, Shatin (HK); Tat Wa Lee, Shatin (HK); Peng Fai Chan, Shatin (HK); Shi Ki Dong, Shatin (HK)

(73) Assignee: Chip and System Technology Limited, Shatin (HK)

( * ) Notice: Subject to any disclaimer, the term of this patent is extended or adjusted under 35 U.S.C. 154(b) by 277 days.

(21) Appl. No.: 12/874,506

(22) Filed: Sep. 2, 2010

(65) Prior Publication Data

US 2011/0050637 A1    Mar. 3, 2011

(30) Foreign Application Priority Data

Sep. 3, 2009    (CN) .......................... 2009 1 0172904

(51) Int. Cl.
 *G06F 3/045*    (2006.01)
 *G06T 17/00*    (2006.01)

(52) U.S. Cl.
 USPC .......................................... 345/174; 345/420

(58) Field of Classification Search
 USPC .................. 345/173, 174, 178, 175, 420, 428
 See application file for complete search history.

(56) References Cited

U.S. PATENT DOCUMENTS

2004/0017362 A1*   1/2004   Mulligan et al. ............... 345/173
2008/0165158 A1*   7/2008   Hotelling et al. ............. 345/174

FOREIGN PATENT DOCUMENTS

| CN | 1942853 A | 4/2005 |
| CN | 101464757 A | 12/2007 |
| CN | 101414236 A | 10/2008 |

* cited by examiner

*Primary Examiner* — Michael Faragalla
(74) *Attorney, Agent, or Firm* — McNeely, Hare & War LLP; Kevin J. McNeely, Esq.

(57) ABSTRACT

A device and a terminal apparatus for processing capacitance of respective layers of a multi-touch panel in the field of multi-touch panels. The method includes scanning to capture capacitance values detected by respective sensors of each layer of the multi-touch panel when the multi-touch panel is touched at multiple positions, and processing the captured capacitance values; converting the processed capacitance values into respective digital capacitance parameters; processing the respective digital capacitance parameters. The invention has the advantageous effect that the capacitance of each layer of the multi-touch panel could be detected and controlled such that the capacitance of each layer falls within a consolidated and controllable range, thereby ensuring an accurate and reliable positioning of multiple simultaneous finger touch on the panel.

10 Claims, 4 Drawing Sheets

20

METHOD, DEVICE AND TERMINAL APPARATUS FOR PROCESSING CAPACITANCE OF RESPECTIVE LAYERS OF MULTI-TOUCH PANEL

CROSS-REFERENCE TO RELATED APPLICATIONS

This utility patent application claims priority to Chinese patent application serial number 200910172904.1 filed on Sep. 3, 2009, which is incorporated by reference herein.

TECHNICAL FIELD

The present invention relates to the field of multi-touch panels, and more particularly to a method, a device and a terminal apparatus for processing capacitance of respective layers of the multi-touch panel.

BACKGROUND OF THE INVENTION

Along with the increased enquires for multimedia information, concerns over the touch panel increase steadily as the touch panel is one of the latest input devices for computers, and presently, it is the most simple, convenient, natural input device adapted for multimedia information enquiries for the situation of the state in PRC. The touch panel is characterized in that it is hard and durable, fast in response time, space saving and easy in interaction. By making use of the multi-touch panel, users could operate the host computer by touching symbols and texts on the display panel of the computer with their finger(s), such that the interaction between human and machine becomes more straightforward. The multi-touch panel provides a convenience for the users who are not familiar with the computer operation, and such interaction between human and machine provides a fresh new perspective and twist on multimedia interaction.

The emergence of the multi-touch panel would surely improve the operating experiences of users. Most of the existing multi-touch panels are designed on the basis of the principle of capacitive touch panels, and the multi-touch panel could analyze and process two or more touch positions of fingers for implementation of more complicated program operations. For example, simultaneous actions of two fingers could trigger image zooming-up and zooming-down operation, website browsing, fixed point zooming at any moment, or the like, such that it is no longer rough sledding for a user to access the internet via a mobile phone.

During the implementation of the present invention, the applicant of the present invention found that the prior art is disadvantageous in that: the key of employment of a capacitive multi-touch panel is the requirement of a unified adjustment of capacitance of each layer, such that the capacitances of the respective layers fall within a consolidated and controllable range, thereby allowing an accurate and simultaneous positioning of finger touch on the panel. As different layers have different intrinsic capacitance values, the existing technologies generally try to minimize the inherit capacitance difference among the layers by minimizing the thickness of each layer during the manufacturing process of the panel. However, the problem of cross coupling between the layers will arise if each layer is made too thin. Accordingly, there is an urgent need for a technology by which the capacitance difference among the layers of the multi-touch panel could be effectively adjusted and allowed.

SUMMARY OF THE INVENTION

It is an object of the present invention to provide a method, a device and a terminal apparatus for processing capacitance of respective layers of a multi-touch panel, so as to effectively process capacitance variations of different layers, thereby providing an effective solution for accurately receiving multiple touch commands on the multi-touch panel.

In order to realize the above object, the present invention provides a device for processing capacitance of respective layers of a multi-touch panel, comprising:
 a plurality of capacitance processing units, each of which being coupled with a plurality of sensors of a respective layer of the multi-touch panel such that each of the capacitance processing unit scans to capture capacitance values detected by the respective sensors of the corresponding layer when the multi-touch panel is touched at multiple positions, and then processes the captured capacitance values;
 a plurality of capacitance converting units, each of which being correspondingly coupled with one of the capacitance processing units for converting the capacitance values processed by the capacitance processing unit into respective digital capacitance parameter outputs; and
 an analyzing and processing unit for analyzing and processing the digital capacitance parameter outputs in order to determine multiple touch positions on the multi-touch panel.

In an example of a preferred embodiment, the device further comprises:
 a plurality of parameter amplification units, each of which having an input end coupled with one of the capacitance processing units and an output end coupled with one of the capacitance converting units so as to amplify the capacitance values processed by the capacitance processing unit by a predetermined ratio and to deliver the amplified capacitance values to the capacitance converting unit for effecting the conversion; and/or
 a storage unit for storing the digital capacitance parameter outputs;
 wherein the capacitance converting unit may be an analog to digital converter (ADC), and the controlling unit thereof may be an application-specific integrated circuit (ASIC).

According to another embodiment of the present invention, there is provided a terminal apparatus, comprising:
 a multi-touch panel on which multiple touch positions are detected;
 a device for processing capacitance of respective layers of the multi-touch panel comprising:
  a plurality of capacitance processing units, each of which being coupled with a plurality of sensors of a respective layer of the multi-touch panel such that each of the capacitance processing unit scans to capture capacitance values detected by the respective sensors of the corresponding layer when the multi-touch panel is touched at multiple positions, and then processes the captured capacitance values;
  a plurality of capacitance converting units, each of which being correspondingly coupled with one of the capacitance processing units for converting the capacitance values processed by the capacitance processing unit into respective digital capacitance parameter outputs; and
  an analyzing and processing unit for determining multiple touch positions on the multi-touch panel as a result of analyzing and processing the digital capacitance parameter outputs.

The device for processing capacitance on respective layers of the multi-touch panel may further comprise a storage unit for storing the digital capacitance parameter outputs; and/or a plurality of amplification units for amplifying the processed capacitance values by a predetermined ratio before effecting the conversion.

According to another yet embodiment of the present invention, there is provided a method for processing capacitance of respective layers of a multi-touch panel, comprising the steps of:

scanning to capture capacitance values detected by respective sensors of each layer of the multi-touch panel when the multi-touch panel is touched at multiple positions, and processing the captured capacitance values;

converting the processed capacitance values into respective digital capacitance parameters which are then analyzed and processed to determine the multiple touch positions on the multi-touch panel.

Preferably, the method further comprises the step of amplifying the processed capacitance values by a predetermined ratio prior to the step of converting the processed capacitance values into the respective digital capacitance parameters.

According to the present invention, the capacitance values captured in the scanning step are detected by the respective sensors of each layer of the multi-touch panel and scanned in a predetermined time interval on a value-by-value basis.

The invention has the advantageous effect that the capacitance of each layer of the multi-touch panel could be detected and controlled such that the capacitance of each layer falls within a consolidated and controllable range, thereby ensuring an accurate and simultaneous positioning of multiple finger touch on the panel.

BRIEF DESCRIPTION OF THE DRAWINGS

The accompanying drawings herein are provided to enable a better understanding of the present invention, which constitute a part of the present application and shall not be construed as limiting the present invention, wherein.

DETAILED DESCRIPTION

For the sake of a better and clearer understanding of the objects, technical solutions, and advantages of the invention, embodiments of the present invention will be illustrated in more details by way of example with reference to the accompanying drawings. The present invention takes a multi-touch panel as an example to illustrate how to obtain accurately the magnitude of the capacitance of each layer to effect the processing of the capacitance of the layers without the need of altering the thickness of each of the layers. Herein the exemplary embodiments and description thereof are provided for illustrating the present invention only and shall not be construed as limiting the present invention, Embodiment 1

Figure 1:
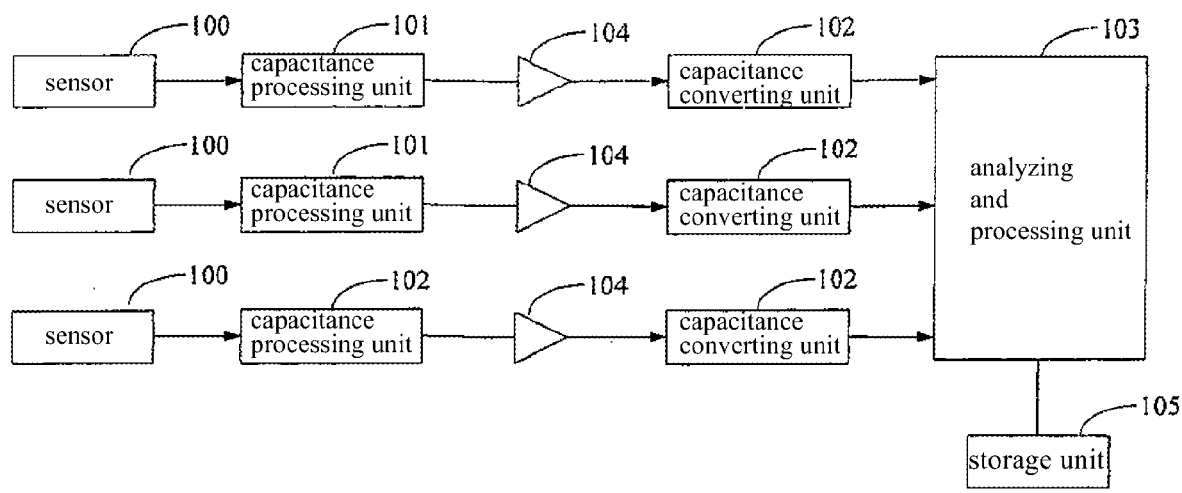
FIG. 1 is a functional and structural block diagram of a device according to a first embodiment of the present invention.

In this embodiment, there is provided a device for processing capacitance of respective layers of a multi-touch panel. FIG. 1 is a functional and structural block diagram of a device of the first embodiment of the present invention. The device comprises a plurality of capacitance processing units 101, each of the capacitance processing units 101 is coupled with a plurality of sensors 100 of one of the layers of the multi-touch panel. Each capacitance processing unit 101 has its corresponding layer, so as to scan to capture capacitance values detected by the respective sensors of the corresponding layer when the multi-touch panel is touched at multiple positions, and to process the captured capacitance values. According to the present invention, each layer of the multi-touch panel has the sensors thereon, and the sensors on the adjacent layers are arranged in an interleaving manner to detect capacitance variations in the respective regions of the layer. The intrinsic capacitance of the corresponding region of each layer detected by the sensor is Cn, wherein:

$$C_n = \epsilon/(d + \lambda_{(n-1)})$$

where d is the thickness of a first isolation layer, $\lambda$ is the distance between the isolation layers, $\epsilon$ is the permittivity, and n is the serial number of the isolation layer. For example, $C_2$ refers to the capacitance value of a X sensor corresponding region of the $2^{nd}$ layer detected by a sensor $X_1$ on the $2^{nd}$ layer, and $C_3$ is the capacitance value of a Y sensor corresponding region of the $3^{rd}$ layer detected by a sensor $Y_3$ on the $3^{rd}$ layer. When multiple fingers touch simultaneously the multi-touch panel, the capacitance values detected by the sensors on the whole panel will be changed into $C_n'$, and the capacitance value of each layer after the touch will be $C_n' = C_n + \delta C_n$, assuming that the capacitance variation of each layer is $\delta C_n$. The plurality of sensors 100 of each layer are all coupled with one of the capacitance processing units 101 for transmitting the detected capacitance values (including the capacitance values detected by the sensors corresponding to the touch positions, and the capacitance values detected by the sensors not corresponding to the touch positions) to the capacitance processing unit 101 with which the sensors are coupled. The capacitance processing unit 101 processes the capacitance values by, for example, eliminating the intrinsic capacitance value $C_n$ of the $C_n'$ based on a preset processing parameter $-C_n$, such that the processed capacitance values of each layer comprises mainly the $\delta C_n$. Where the preset processing parameter $-C_n$ could be obtained with reference to the intrinsic capacitance $C_n$ of the layer detected before the fingers touch the multi-touch panel. For instance, the preset processing parameter of the capacitance processing unit 101 coupled with the sensors 100 on the $2^{nd}$ layer is set to be $-C_2$.

The transmission of the capacitance value detected by each of the sensors to the capacitance processing unit 101 coupled with the sensors is realized by, for example, scanning to capture the capacitance values detected by the respective sensors in a predetermined time interval on a value-by-value basis. Taking a two dimensional surface as an example, when the sensors X on a layer are arranged in a X positive direction $(X_1, X_2, X_3, X_4, \ldots, X_n)$, the scanning can be preset in a positive direction at a uniform speed such that the time interval for scanning each of the sensors is identical to capture the capacitance values detected by $X_1$ to $X_n$ on a value-by-value basis, and the next cycle of scanning restarts from $X_1$. Likewise, when the sensors Y on another layer are arranged in a Y positive direction $(Y_1, Y_2, Y_3, Y_4, \ldots, Y_n)$, the scanning can be preset in a positive direction at a uniform speed such that the time interval for scanning each of the sensors is identical to capture the capacitance values detected by $Y_1$ to $Y_n$ on a value-by-value basis, and the next cycle of scanning restarts from $Y_1$. In this way, the capacitance processing units 101 corresponding to the two layers could capture the capacitance values detected by the respective sensors.

The device further comprises a plurality of capacitance converting units 102, each of which is correspondingly coupled with one of the capacitance processing units 101 for converting the capacitance values processed by the capacitance processing unit 101 into respective digital capacitance parameter outputs. As the sensors 100 and the capacitance processing units 101 are actually detecting and processing analog capacitance parameters, the capacitance values $\delta C_n$ processed by the capacitance processing units 101 needs to be converted into the digital parameters before being analyzed and processed by a digital analyzing and processing unit 10. Therefore, the capacitance converting units 102 of the present invention are able to convert the capacitance values $\delta C_n$ processed by the capacitance processing unit 101 into the digital capacitance parameter outputs.

The analyzing and processing unit 103 is coupled with the plurality of capacitance converting units 102 for analyzing and processing the digital capacitance parameters $\delta C_n$ received from the capacitance converting units 102, in order to determine the multiple touch positions on the multi-touch panel. It would be appreciated that analyzing and processing the digital capacitance parameters in order to determine the multiple touch positions on the multi-touch panel is not essence of the invention, and therefore not described herein.

Generally, the capacitance value detected by the sensor 100 is relatively small in practice and is not adapted to be input into the capacitance converting unit 102 if it is not subject to a proper amplification. Therefore, according to the embodiment of the present invention, a plurality of parameter amplification units 104 are arranged between the capacitance processing units 101 and the capacitance converting units 102, wherein each of the parameter amplification units 104 has an input end coupled with one of the capacitance processing units 101 and an output end coupled with one of the capacitance converting units 102, so as to amplify the capacitance value processed by the capacitance processing unit 101 by a predetermined ratio and then to deliver the amplified capacitance value to the capacitance converting unit 102 for effecting the conversion. For example, the predetermined ratio is A, then the amplified capacitance value is $A\delta C_n$, where the value of A is determined substantially based on the input range of the capacitance converting units 102.

According to the embodiment of the present invention, the device further comprises a storage unit for storing the digital capacitance parameter outputs.

Figure 2:
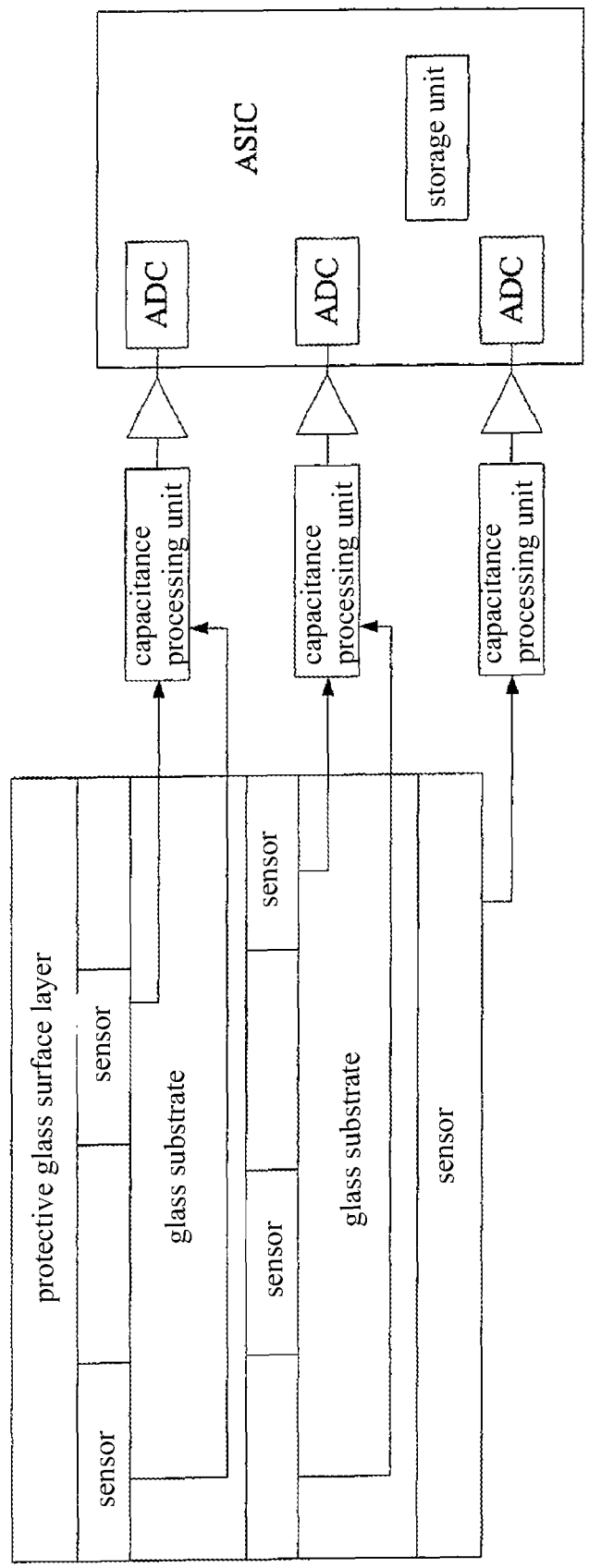
FIG. 2 is a schematic block diagram of an exemplary device of the first embodiment of the present invention.

In order that a person skilled in the art sufficiently understands the present invention, an exemplary device shown in FIG. 2 is provided for the clarity and illustration. FIG. 2 is a functional schematic diagram of the exemplary device of the present invention. Taking a double-layer capacitive touch panel as an example, wherein the capacitance converting unit 102 is an analog to digital converter (ADC), and a controlling unit is an application-specific integrated circuit (ASIC). A plurality of ADCs are coupled with an ASIC, wherein each of the ADCs has an input end coupled with an output end of a signal amplifier having an input end coupled with an output end of the capacitance converting unit, while the input end of the capacitance converting unit is coupled with a plurality of sensors arranged on a layer. Both the surface layer and the bottom layer of the double-layer capacitive touch panel are used as a sensing layer and able to detect the touch positions of fingers, and an isolation layer between the double layers is a glass substrate. Before a finger touches the panel, the capacitance value of the protective surface layer is $C_1$, the capacitance value between the second glass substrate layer and the surface layer is $C_2$, and the capacitance value between the third glass substrate layer and the surface layer is $C_3$.

Accordingly, the capacitance value detected by the sensors on the surface layer is $C_1$, the capacitance value detected by the sensors on the second layer is $C_2$, and the capacitance value detected by the sensors on the third layer is $C_3$. The capacitance converting unit associated with the sensors of the corresponding layer would generate a capacitance processing parameter based on the initial capacitance value between the adjacent layers. For example, the capacitance processing parameter generated by the capacitance converting unit associated with the sensors of the surface layer is $-C_1$, the capacitance processing parameter generated by the capacitance converting unit associated with the sensors of the second layer is $-C_2$, and the capacitance processing parameter generated by the capacitance converting unit associated with the sensors of the third layer is $-C_3$. After the finger touches the panel, the capacitance value of each of the layers will correspondingly increase by $\delta C_n$ (it should be understood that, because of the touch position, the $\delta C_n$ values detected by the sensors on each layer are different, wherein the $\delta C_n$ value detected by the sensor corresponding to the touch position is relatively large, while the $\delta C_n$ values detected by the sensors in the vicinity of and away from the touch position are relatively small, or even noise would be detected by the sensors in some cases), where the capacitance value detected by the sensors on the surface layer, which correspond to the touch position, is $C_1+\delta C_1$, the capacitance value detected by the sensors on the second layer, which correspond to the touch position, is $C_2+\delta C_2$, and the capacitance value detected by the sensors on the third layer, which correspond to the touch position, is $C_3+\delta C_3$. The capacitance processing units corresponding to the respective layers scan to capture the detected capacitance values $C_n+\delta C_n$, wherein the capacitance converting unit associated with the sensors of the surface layer processes the detected capacitance value of the surface layer, namely $C_1+\delta C_1-C_1=\delta C_1$ to obtain a processed capacitance parameter which is $\delta C_1$; the capacitance converting unit associated with the sensors of the second layer processes the detected capacitance value of the second layer, namely $C_2+\delta C_2-C_2=\delta C_2$ to obtain a processed capacitance parameter which is $\delta C_2$; and the capacitance converting unit associated with the sensors of the third layer processes the detected capacitance value of the third layer, namely $C_3+\delta C_3-C_3=\delta C_3$, to obtain a processed capacitance parameter which is $\delta C_3$. The processed capacitance value of each layer is amplified by the amplifier by a factor A (i.e. the gain parameter is +A), the amplification result is $A\delta C_n$ (n=1, 2, or 3), and each of the ADCs would convert the received analog capacitance parameter $A\delta C_n$ into a digital parameter which is delivered to the ASIC where the digitalized parameter $A\delta C_n$ is analyzed and processed through an integral equation and/or an interpolation, in order to determine the multiple touch positions on the multi-touch panel. The digital parameter $A\delta C_n$ can be stored in the storage unit to provide an effective solution for accurately receiving multiple touch commands on the multi-touch panel.

The device of the invention has the advantageous effect that the capacitance value of each layer of the multi-touch panel could be processed independently, such that the capacitance value of each layer could be compensated separately when fingers touch the panel. This ensures that the controlling unit could handle the gain of the capacitance value of each layer in the same manner, thereby providing an effective solution for accurately receiving multiple touch commands on the multi-touch panel.

Embodiment 2

Figure 3:
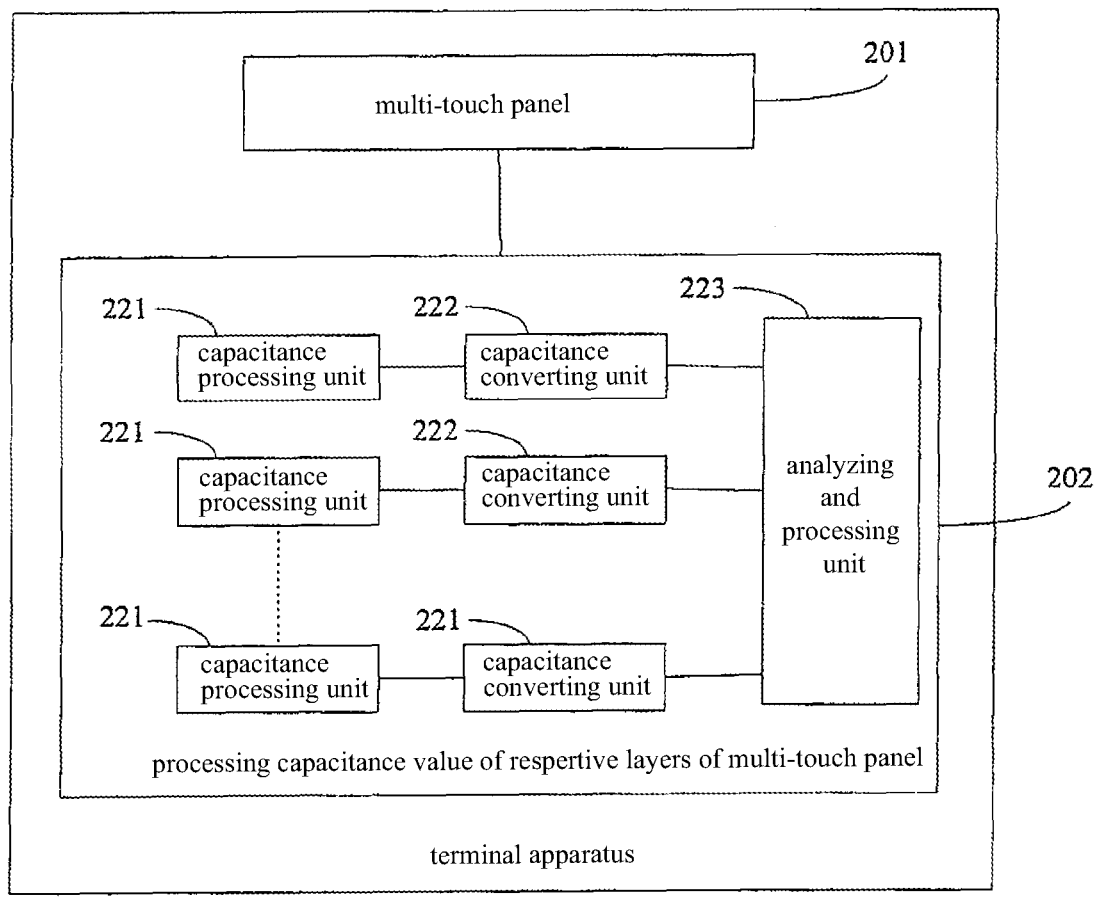
FIG. 3 is a functional block diagram of a terminal apparatus according to a second embodiment of the present invention.

The present invention further provides a terminal apparatus shown in FIG. 3. FIG. 3 is a functional and structural block diagram of the terminal apparatus, which comprises:

a plurality of capacitance processing units 221, each of which being coupled with a plurality of sensors of a respective layer of the multi-touch panel such that each of the capacitance processing unit scans to capture capacitance values detected by the respective sensors of the corresponding layer when the multi-touch panel is touched at multiple positions, and then processes the captured capacitance values;

a plurality of capacitance converting units 222, each of which being correspondingly coupled with one of the capacitance processing units for converting the capacitance values processed by the capacitance processing unit into respective digital capacitance parameter outputs; and an analyzing and processing unit 223 for determining multiple touch positions on the multi-touch panel as a result of analyzing and processing the digital capacitance parameter outputs.

According to the present invention, the device for processing capacitance of the respective layers of the multi-touch panel further comprises a storage unit and a plurality of amplification units (not shown). The storage unit is adapted for storing the digital capacitance parameters, and the amplification units are adapted for amplifying the processed capacitance values by a predetermined ratio before effecting the analog to digital conversion.

The terminal apparatus of the invention allows a better multiple-position touch on the multi-touch panel to improve the operating experiences of users, and allows an effective positioning of multiple finger touch on the multi-touch panel for a more precise user operation by means of the device for processing the capacitance of each layer of the multi-touch pane. Unlike the existing technology for making the multi-layer capacitance sensing panel, there is no need in the invention to reduce the inherit capacitance difference among the layers by minimizing the thickness of each layer, the thickness is no longer constrained and could be adjusted freely, thereby ensuring the structural strength and life span of the multi-touch panel.

Embodiment 3

Figure 4:
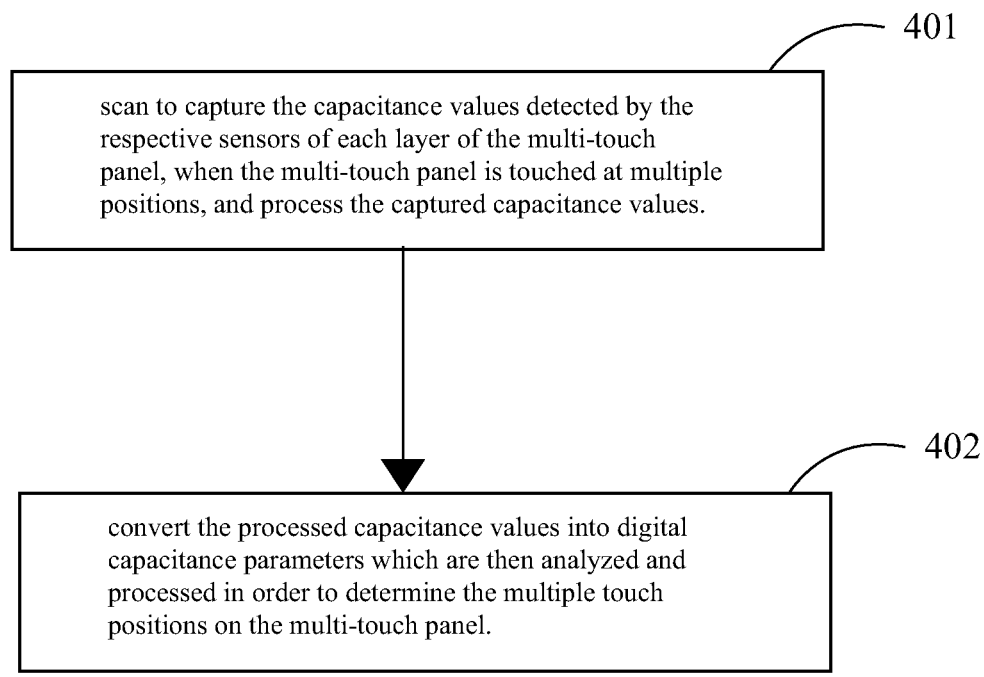
FIG. 4 is a flow chart of a method according to a third embodiment of the present invention.

The present invention also provides a method for processing capacitance of respective layers of a multi-touch panel shown in FIG. 4. FIG. 4 is a flow chart of the method of the invention, which comprises the step of:

(401) scanning to capture capacitance values detected by respective sensors of each layer of the multi-touch panel when the multi-touch panel is touched at multiple positions, and processing the captured capacitance values.

In this step, a plurality of sensors are arranged on each layer of the multi-touch panel, the sensors of each layer are arranged in an interleaving manner for detecting the capacitance variations in respective regions of the layer. Each of the capacitance value is processed by the Auto Zero offset compensation technique, for instance, the intrinsic capacitance parameter of the detected capacitance value is eliminated based on a preset processing parameter, while the capacitance variation parameter remains, wherein the preset processing parameter can be generated based on the intrinsic capacitance parameter of each layer. The capacitance values captured in this step are detected by the respective sensors of each layer of the multi-touch panel and scanned in a predetermined time interval on a value-by-value basis. For example, the scanning of each sensor can be made in a direction at a uniform speed to capture the detected capacitance values on a value-by-value basis.

The method of the invention further comprises the step of:

(402) converting the processed capacitance values into respective digital capacitance parameters which are then analyzed and processed to determine the multiple touch positions on the multi-touch panel.

Since the step (401) is to process the captured analog capacitance parameters, the parameters processed in step (401) need be converted into the respective digital parameters for the subsequent processing of the digital parameters, which convertion can be realized via a ADC. The converted digital parameters are then analyzed and processed in order to accurately determine the touch positions on the panel. It would be appreciated that determining the touch positions on the multi-touch panel according to varied digital capacitance parameters $\delta C_n$ is not essence of the invention, and therefore not described herein.

In view of the fact that the detected capacitance value is relatively small in practice and is not fulfill the requirement for digital parameter conversion if it is not subject to a proper amplification. Therefore, the method of the invention further comprises the step of amplifying the processed capacitance values by a predetermined ratio prior to the step of converting the processed capacitance values into the respective digital capacitance parameters, for facilitating the subsequent step in a more smooth way.

The method of the present invention allows the processing of the capacitance of each layer of the multi-touch panel. Unlike the existing technologies, there is no need in the invention to reduce the inherit capacitance difference among layers by minimizing the thickness of each layer, and the thickness of each layer would not affect the detection of the capacitance value of the layer, which eases the burden of manufacturing the panel to some extent. Thus, the invention allows to manufacture a multi-touch panel with a desirable thickness according to the actual needs.

Having sufficiently described the nature of the present invention according to some preferred embodiments, the invention, however, should not be limited to the structures and functions of the embodiments and drawings. It is stated that insofar as its basic principle is not altered, changed or modified it may be subjected to variations of detail. Numerous variations and modifications that are easily obtainable by means of the skilled person's common knowledge without departing from the scope of the invention should fall into the scope of this invention.

What is claimed is:

1. A device for processing capacitance of a plurality of layers of a multi-touch panel, wherein each layer of the multi-touch panel has a plurality of sensors, comprising:

a plurality of capacitance processing units, each of which being coupled with a plurality of sensors of a respective layer of the multi-touch panel such that each of the capacitance processing unit scans to capture capacitance values detected by the respective sensors of the corresponding layer when the multi-touch panel is touched at multiple positions, and then processes the captured capacitance values, wherein the detected capacitance value is the summation of an intrinsic capacitance value of the corresponding layer and a capacitance variation of the corresponding layer, the intrinsic capacitance value is formed between a surface of the sensor and a surface of the panel, the capacitance variation is a result of the touch on the sensor of the corresponding layer, and wherein each capacitance processing unit processes the captured capacitance values of each layer by eliminating the intrinsic capacitance value such that the processed capacitance values comprises mainly the capacitance variation;

a plurality of capacitance converting units, each of which being correspondingly coupled with one of the capacitance processing units for converting the capacitance values processed by the capacitance processing unit into respective digital capacitance parameter outputs; and an analyzing and processing unit for analyzing and processing the digital capacitance parameter outputs in order to determine multiple touch positions on the multi-touch panel, wherein the capacitance values of each layer of the multi-touch panel is processed independently, such that the capacitance values of each layer are compensated separately when the panel is touched.

2. The device according to claim 1, wherein the device further comprises a plurality of parameter amplification units, each of which having an input end coupled with one of the capacitance processing units and an output end coupled with one of the capacitance converting units so as to amplify the capacitance values processed by the capacitance processing unit by a predetermined ratio and to deliver the amplified capacitance values to the capacitance converting unit for effecting the conversion.

3. The device according to claim 2, wherein the plurality of the capacitance processing units scan to capture the capacitance values in a predetermined time interval on a value-by-value basis, the capacitance values being detected by the respective sensors of the corresponding layer.

4. The device according to claim 1, wherein the device further comprises a storage unit for storing the digital capacitance parameter outputs.

5. A terminal apparatus, comprising:
a multi-touch panel on which multiple touch positions are detected;
a device for processing capacitance of a plurality of layers of the multi-touch panel wherein each layer of the multi-touch panel has a plurality of sensors, comprising:
a plurality of capacitance processing units, each of which being coupled with a plurality of sensors of a respective layer of the multi-touch panel such that each of the capacitance processing unit scans to capture capacitance values detected by the respective sensors of the corresponding layer when the multi-touch panel is touched at multiple positions, and then processes the captured capacitance values, wherein the detected capacitance value is the summation of an intrinsic capacitance value of the corresponding layer and a capacitance variation of the corresponding layer, the intrinsic capacitance value is formed between a surface of the sensor and a surface of the panel, the capacitance variation is a result of the touch on the sensor of the corresponding layer, and wherein each capacitance processing unit processes the captured capacitance values of each layer by eliminating the intrinsic capacitance value such that the processed capacitance values comprises mainly the capacitance variation;
a plurality of capacitance converting units, each of which being correspondingly coupled with one of the capacitance processing units for converting the capacitance values processed by the capacitance processing unit into respective digital capacitance parameter outputs; and
an analyzing and processing unit for determining multiple touch positions on the multi-touch panel as a result of analyzing and processing the digital capacitance parameter outputs,
wherein the capacitance values of each layer of the multi-touch panel is processed independently, such that the capacitance values of each layer are compensated separately when the panel is touched.

6. The terminal apparatus according to claim 5, wherein the device for processing capacitance of respective layers of the multi-touch panel further comprises a storage unit for storing the digital capacitance parameter outputs.

7. The terminal apparatus according to claim 6, wherein the device for processing capacitance of respective layers of the multi-touch panel further comprises a plurality of amplification units for amplifying the processed capacitance values by a predetermined ratio before effecting the conversion.

8. A method for processing capacitance of a plurality of layers of a multi-touch panel wherein each layer of the multi-touch panel has a plurality of sensors, comprising steps of:
scanning to capture capacitance values detected by respective sensors of each layer of the multi-touch panel when the multi-touch panel is touched at multiple positions, and processing the captured capacitance values, wherein the detected capacitance value is the summation of an intrinsic capacitance value of the corresponding layer and a capacitance variation of the corresponding layer, the intrinsic capacitance value is formed between a surface of the sensor and a surface of the panel, the capacitance variation is a result of the touch on the sensor of the corresponding layer, and wherein each capacitance processing unit processes the captured capacitance values of each layer by eliminating the intrinsic capacitance value such that the processed capacitance values comprises mainly the capacitance variation;
converting the processed capacitance values into respective digital capacitance parameters which are then analyzed and processed to determine the multiple touch positions on the multi-touch panel,
wherein the capacitance values of each layer of the multi-touch panel is processed independently, such that the capacitance values of each layer are compensated separately when the panel is touched.

9. The method according to claim 8, further comprising the step of amplifying the processed capacitance values by a predetermined ratio prior to the step of converting the processed capacitance values into the respective digital capacitance parameters.

10. The method according to claim 9, wherein the capacitance values captured in the scanning step are detected by the respective sensors of each layer of the multi-touch panel and scanned in a predetermined time interval on a value-by-value basis.

* * * * *